(12) United States Patent
Feng et al.

(10) Patent No.: US 12,473,990 B2
(45) Date of Patent: Nov. 18, 2025

(54) VALVE DEVICE

(71) Applicant: ZHEJIANG DUNAN ARTIFICIAL ENVIRONMENT CO., LTD., Shaoxing (CN)

(72) Inventors: Zhongbo Feng, Shaoxing (CN); Ju Jin, Shaoxing (CN); Fugang Wang, Shaoxing (CN); Wenrong Zhang, Shaoxing (CN); Zhiguo Song, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 36 days.

(21) Appl. No.: 18/517,025

(22) Filed: Nov. 22, 2023

(65) Prior Publication Data

US 2024/0084911 A1 Mar. 14, 2024

Related U.S. Application Data

(63) Continuation of application No. PCT/CN2022/093881, filed on May 19, 2022.

(30) Foreign Application Priority Data

May 24, 2021 (CN) .......................... 202121121938.0

(51) Int. Cl.
F16K 27/00 (2006.01)
F16K 27/02 (2006.01)

(52) U.S. Cl.
CPC .............. *F16K 27/02* (2013.01); *F16K 27/00* (2013.01)

(58) Field of Classification Search
CPC ........ F16K 27/00; F16K 27/02; F16K 27/029; F16K 2200/50; F16K 2200/501; Y10T 137/0491; Y10T 137/6011; F16L 37/146
See application file for complete search history.

(56) References Cited

U.S. PATENT DOCUMENTS

| | | | | |
|---|---|---|---|---|
| 4,519,638 A * | 5/1985 | Yodoshi | .................. | F16L 25/08 285/305 |
| 2005/0151107 A1 | 7/2005 | Shu | | |
| 2017/0241550 A1 | 8/2017 | Sabotta et al. | | |

FOREIGN PATENT DOCUMENTS

| CN | 209294429 U | 8/2019 |
|---|---|---|
| CN | 209294521 U | 8/2019 |

(Continued)

OTHER PUBLICATIONS

European Search Report of EP22810454.3.
Notice of Reasons for Refusal of JP2023563848.
International Search Report of PCT/CN2022/093881.

*Primary Examiner* — Hailey K. Do

(57) ABSTRACT

A valve device is provided, including a valve body unit and a valve seat. The valve seat is provided with a mounting cavity, and an end of the valve body unit is mounted in the mounting cavity. The valve device further includes a limiting unit, an outer side wall of the valve seat is provided with a mounting hole in communication with the mounting cavity along a radial direction of the mounting cavity, a side wall of the mounting cavity is recessed to form a mounting groove corresponding to the mounting hole, an end of the limiting unit extends into the mounting cavity from the mounting hole and is inserted into the mounting groove, and the limiting unit that extends into the mounting cavity abuts against the valve body unit to perform limiting along an axial direction and a circumferential direction between the valve body unit and the valve seat.

11 Claims, 7 Drawing Sheets

(56) References Cited

FOREIGN PATENT DOCUMENTS

| | | | |
|---|---|---|---|
| CN | 110966414 A | 4/2020 | |
| CN | 110966445 A | 4/2020 | |
| CN | 111594628 A | 8/2020 | |
| CN | 215059860 U | 12/2021 | |
| DE | 102013111456 A1 | 4/2015 | |
| DE | 102019119889 | 2/2020 | |
| EP | 1024324 A2 * | 8/2000 | ............ F16L 37/146 |
| EP | 2594808 A1 | 5/2013 | |
| GB | 732186 A * | 6/1955 | |
| JP | S60043779 U | 3/1985 | |

\* cited by examiner

VALVE DEVICE

CROSS-REFERENCE TO RELATED APPLICATIONS

This application is a continuation of international patent application No. PCT/CN2022/093881, filed on May 19, 2022, which itself claims priority to Chinese patent application No. 202121121938.0, filed on May 24, 2021, titled "VALVE DEVICE". The content of the above applications is hereby incorporated by reference.

TECHNICAL FIELD

The present disclosure generally relates to the field of refrigeration, and in particular, to a valve device.

BACKGROUND

A valve device is an important component in a refrigeration device, mainly playing a role of throttling and pressure reduction. The valve device includes components such as a valve body, a sleeve, a guiding sleeve, a valve rod assembly, a nut sleeve, and a driving mechanism. The sleeve is mounted on the valve body, the valve body is provided with a valve port, and the nut sleeve and the guiding sleeve are mounted on the valve body. The valve rod assembly is mounted inside the guiding sleeve, and can move along the guiding sleeve and the nut sleeve under action of the driving mechanism to open or close the valve port, so as to realize purpose of throttling and pressure reduction.

In a conventional valve device, a position relationship between a valve seat and the valve body is determined by a limiting member. It is achieved by contacting the valve body with the limiting member that limiting axial movement of the valve body away from the valve seat, thereby failing to completely ensure that the position relationship between the valve seat and the valve body does not change, and affecting normal operation of the valve device.

SUMMARY

According to various embodiments of the present disclosure, a valve device is provided, including a valve body unit and a valve seat. The valve seat is provided with a mounting cavity, and an end of the valve body unit is mounted in the mounting cavity. The valve device further includes a limiting unit, an outer side wall of the valve seat is provided with a mounting hole extending in a radial direction of a cross section of the mounting cavity along a radial direction of the valve body unit, the mounting hole is in communication with the mounting cavity, a side wall of the mounting cavity is recessed to form a mounting groove corresponding to the mounting hole, a part of the valve body unit is inserted into the mounting cavity, the valve body unit is provided with a limiting groove corresponding to the mounting groove along the radial direction of the cross section of the mounting cavity, an end of the limiting unit extends into the mounting cavity from the mounting hole and is inserted into the mounting groove, and a part of the limiting unit that extends into the mounting cavity abuts against the limiting groove to perform limiting along an axial direction and a circumferential direction between the valve body unit and the valve seat.

In an embodiment, the limiting unit is connected to the mounting groove by an interference fit, and is connected to the mounting hole by an interference fit; or the limiting unit is threadedly connected to the mounting groove, and is connected to the mounting hole by an interference fit.

In an embodiment, the limiting unit is threadedly connected to either or both of the mounting groove and the mounting hole; or the limiting unit is connected to the mounting groove by an interference fit, and is threadedly connected to the mounting hole.

In an embodiment, the limiting unit includes a limiting rod, an end of the limiting rod extends into the mounting cavity from the mounting hole, abuts against the limiting groove, and is inserted into the mounting groove, and the other end of the limiting rod is located in the mounting hole.

In an embodiment, the limiting unit includes a locking member threadedly connected to the mounting hole, and an end of the locking member abuts against the limiting rod.

In an embodiment, the locking member includes a bolt or a screw.

In an embodiment, a cross section shape of the limiting rod includes any one of a circle, a square, or an oval.

In an embodiment, the valve body unit includes a valve body and a mounting seat, and the mounting seat is fixed to an end of the valve body; the end of the valve body is mounted in the mounting cavity, the mounting seat is accommodated in the mounting cavity with the mounting of the valve body, the limiting groove is provided on the mounting seat, and the limiting unit abuts against the mounting seat and the limiting groove.

In an embodiment, the limiting unit includes a limiting member arranged in an integrated way, and the limiting member includes an insertion portion, an abutment portion, and a connecting portion arranged in order; when the limiting member is inserted into the mounting hole, the insertion portion is inserted into the mounting groove, the abutment portion abuts against an outer wall of the valve body unit, and the connecting portion is located in the mounting hole and connected to the valve seat.

In an embodiment, the same side wall of the valve seat is provided with two mounting holes at interval, and the number of limiting units and the number of mounting grooves are the same as the number of the mounting holes, respectively.

In an embodiment, different side walls of the valve seat are provided with two mounting holes at interval, and the number of limiting units and the number of mounting grooves are the same as the number of the mounting holes, respectively.

In an embodiment, the same side wall of the valve seat is provided with two mounting holes at interval; the number of limiting units is the same as the number of the mounting holes; and the mounting groove extends along a circumferential direction of the mounting cavity, and two limiting units are inserted into the mounting groove.

In an embodiment, different side walls of the valve seat are provided with two mounting holes at interval; the number of limiting units is the same as the number of the mounting holes; and the mounting groove extends along a circumferential direction of the mounting cavity, and two limiting units are inserted into the mounting groove.

In an embodiment, an axis of the limiting unit is perpendicular to an axis of the valve body unit.

Details of one or more embodiments of the present disclosure are set forth in the following accompanying drawings and description. Other features, objects, and advantages of the present disclosure will become apparent from the specification, the accompanying drawings, and the claims.

BRIEF DESCRIPTION OF THE DRAWINGS

Reference may be made to one or more of the accompanying drawings for a purpose of better describing and illustrating the embodiments and/or examples of those applications disclosed herein. Additional details or examples used to describe the accompanying drawings should not be considered a limitation on the scope of any of the disclosed applications, the embodiments and/or examples presently described, and the best mode of these applications as presently understood.

Figure 1:
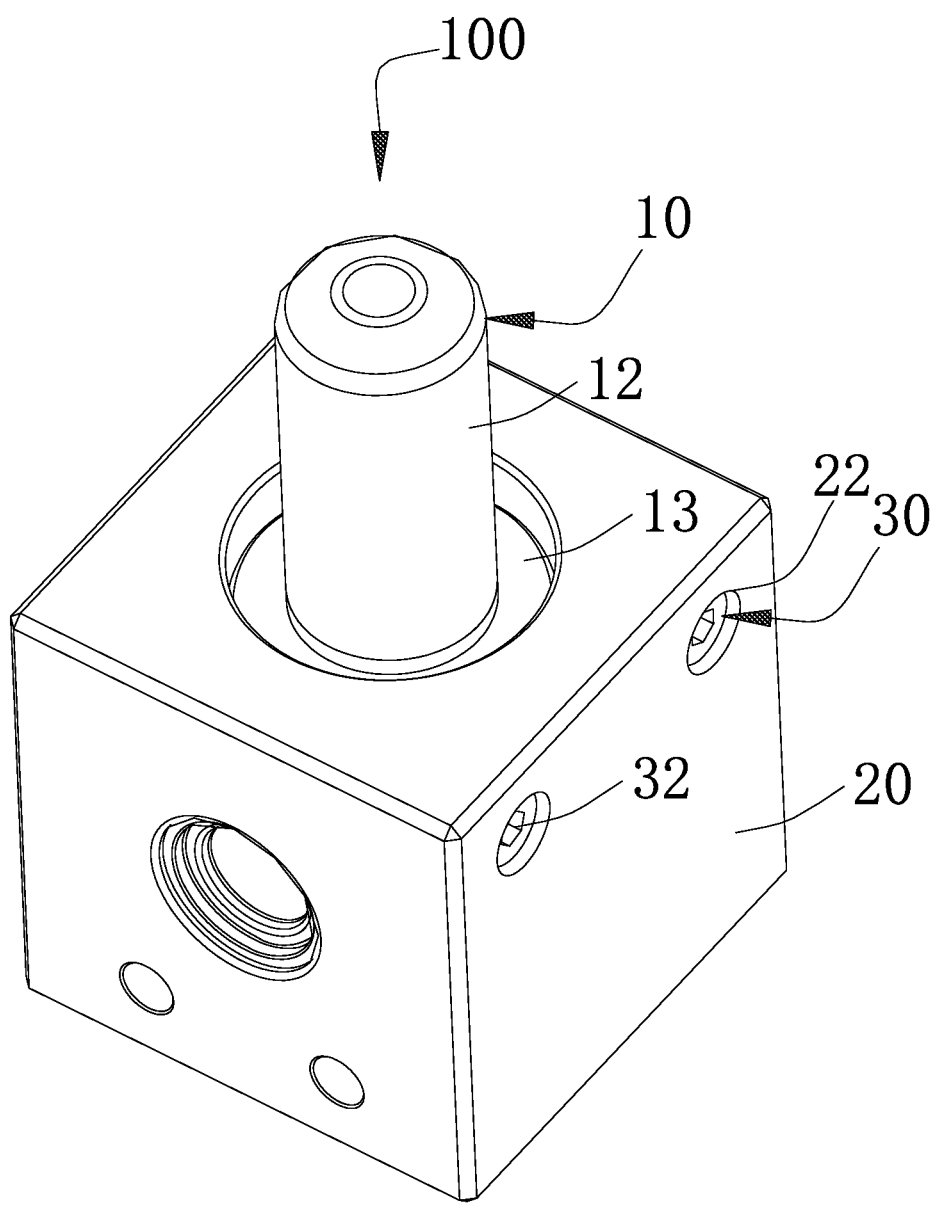
FIG. 1 is a schematic diagram of an assembly structure of a valve device in an embodiment of the present disclosure.

The labels in the figures indicate the following meanings:

100 represents a valve device, 10 represents a valve body unit, 11 represents a limiting groove, 12 represents a valve body, 13 represents a mounting seat, 20 represents a valve seat, 21 represents a mounting cavity, 22 represents a mounting hole, 23 represents a mounting groove, 30 represents a limiting unit, 31 represents a limiting rod, 32 represents a locking member, 33 represents a limiting member, 331 represents an insertion portion, 332 represents an abutment portion, and 333 represents a connecting portion.

DETAILED DESCRIPTION OF THE EMBODIMENT

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without making creative labor are the scope of the present disclosure.

It should be noted that when an assembly is considered to be "disposed on" another assembly, it can be directly disposed to another assembly, or there can be a centered assembly. When an assembly is considered to be "set on" another assembly, it can be directly set on another assembly, or there can be a centered assembly at the same time. When an assembly is considered to be "fixed to" another assembly, it can be directly fixed to another assembly, or there can be a centered assembly at the same time.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

Referring to FIG. 1 to FIG. 11, the present disclosure provides a valve device 100, applied to an air conditioning and refrigeration system to regulate flow and pressure of a fluid medium.

Specifically, the valve device 100 includes a valve body unit 10 and a valve seat 20. The valve seat 20 is provided with a mounting cavity 21, and an end of the valve body unit 10 is mounted in the mounting cavity 21. The valve device 100 further includes a limiting unit 30, an outer side wall of the valve seat 20 is provided with a mounting hole 22 extending in a radial direction of a cross section of the mounting cavity 21 along a radial direction of the valve body unit 10, the mounting hole 22 is in communication with the mounting cavity 21, a side wall of the mounting cavity 21 is recessed to form a mounting groove 23 corresponding to the mounting hole 22, an end of the limiting unit 30 extends into the mounting cavity 21 from the mounting hole 22 and abuts against a part of the valve body unit 10 extending into the mounting cavity 21, and the end of the limiting unit 30 extending into the mounting cavity 21 is inserted into the mounting groove 23.

It should be noted that in a conventional valve device, a position relationship between a valve seat and the valve body is determined by a limiting member. It is achieved by contacting the valve body with the limiting member that limiting axial movement of the valve body away from the valve seat, thereby failing to completely ensure that the position relationship between the valve seat and the valve body does not change, and affecting normal operation of the valve device. In the present embodiment, the end of the limiting unit 30 extends into the mounting cavity 21 from the mounting hole 22 and is inserted into the mounting groove 23, and the limiting unit 30 that extends into the mounting cavity 21 abuts against the valve body unit 10 to perform limiting along an axial direction and a circumferential direction between the valve body unit 10 and the valve seat 20.

Figure 2:
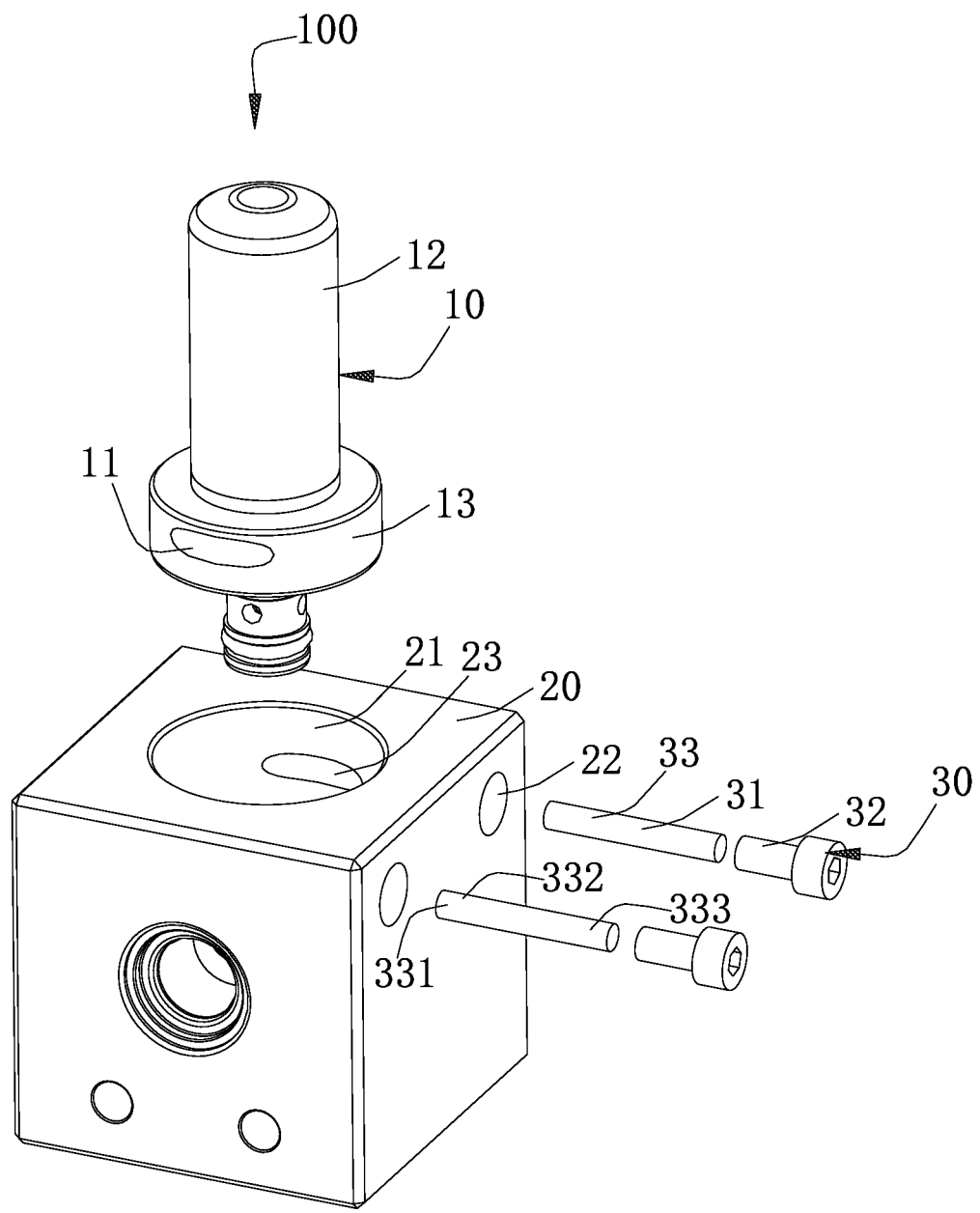
FIG. 2 is a schematic diagram of an exploded structure of a valve device in an embodiment of the present disclosure.
Figure 3:
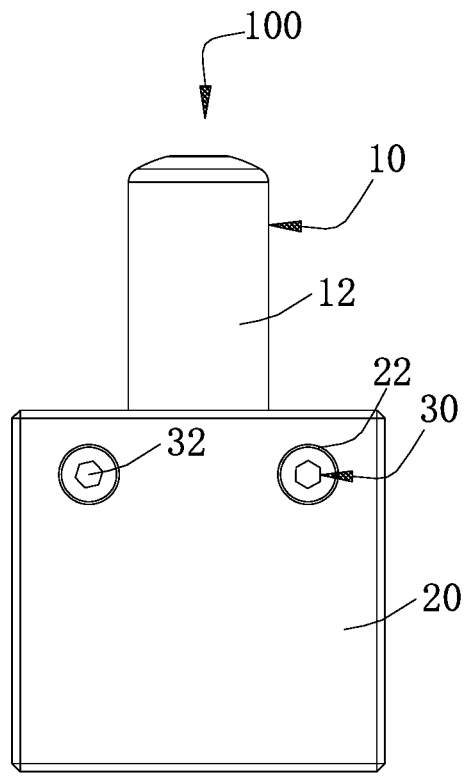
FIG. 3 is a schematic diagram of an assembly structure of a valve device with a view in an embodiment of the present disclosure.
Figure 4:
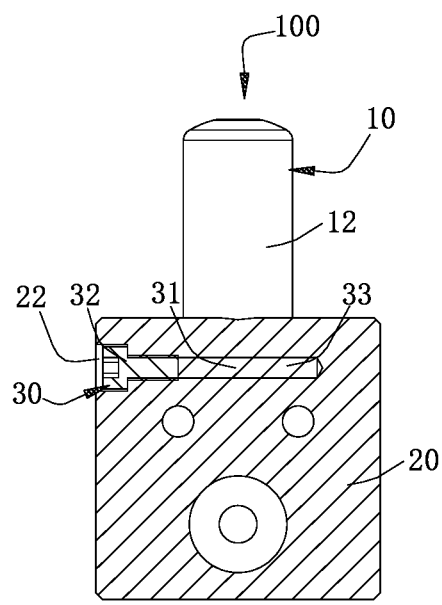
FIG. 4 is a schematic diagram of a cross section of a valve seat with a view in an embodiment of the present disclosure.
Figure 5:
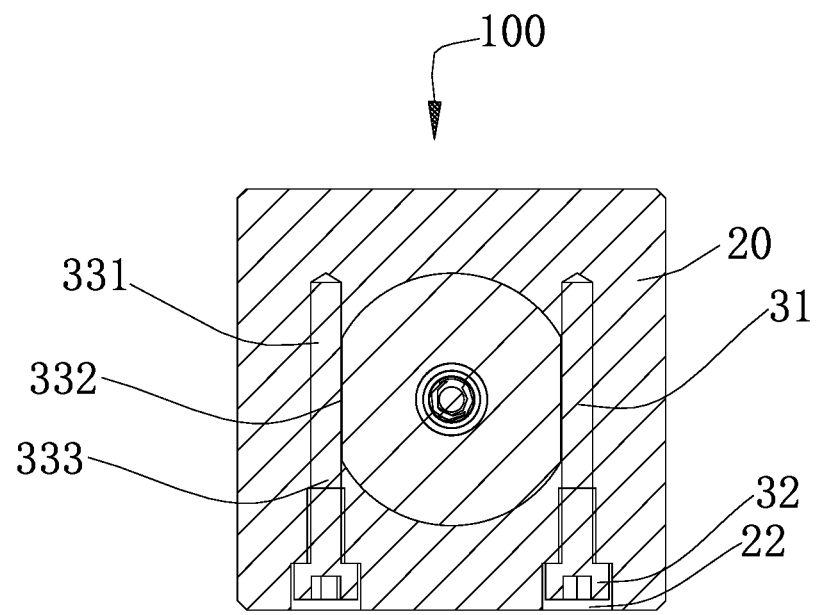
FIG. 5 is a schematic diagram of a cross section of a valve seat with another view in an embodiment of the present disclosure.
Figure 6:
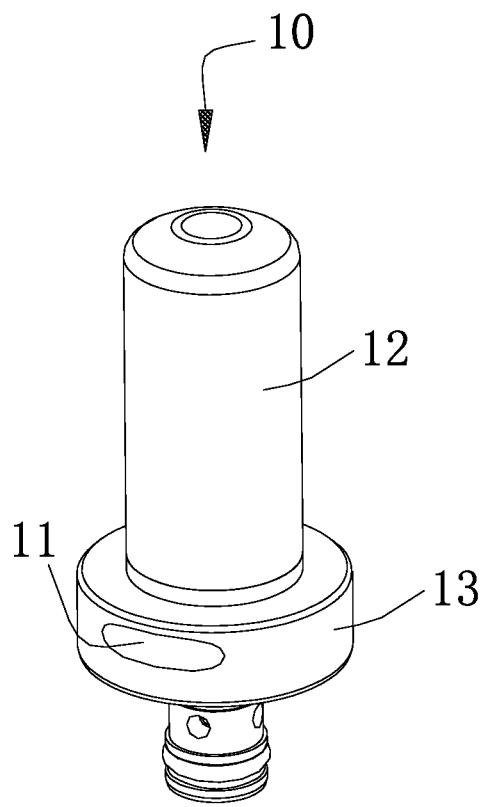
FIG. 6 is a schematic diagram of a valve body unit in an embodiment of the present disclosure.
Figure 7:
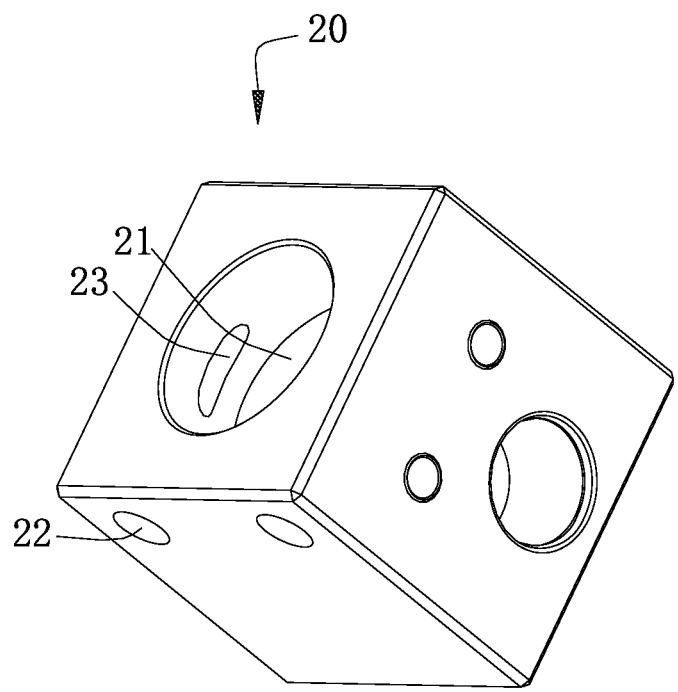
FIG. 7 is a schematic diagram of a valve seat in an embodiment of the present disclosure.
Figure 8:
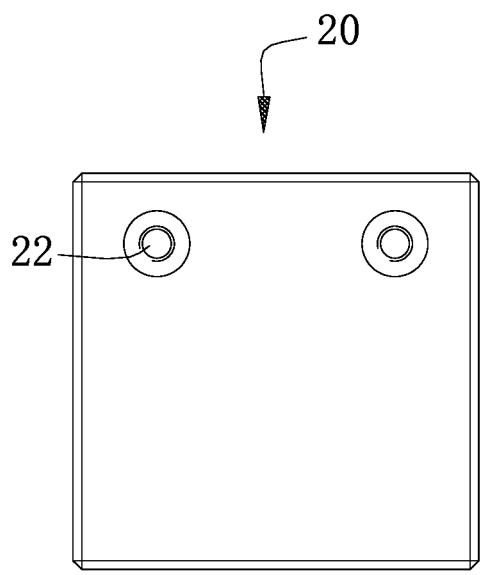
FIG. 8 is a schematic diagram of a valve seat with a view in an embodiment of the present disclosure.
Figure 9:
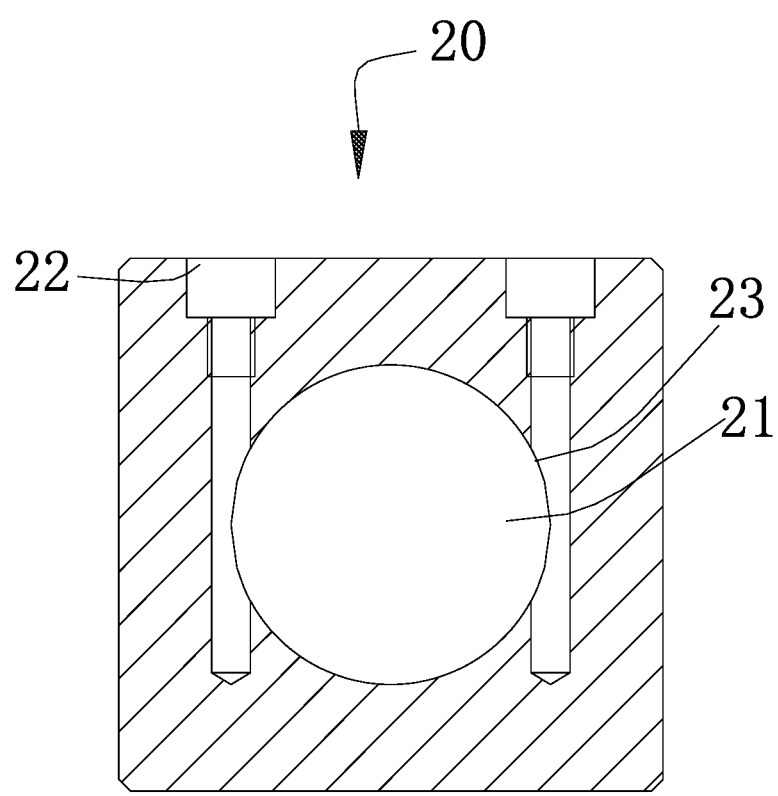
FIG. 9 is a schematic diagram of a cross section of a valve seat with a view in an embodiment of the present disclosure.
Figure 10:
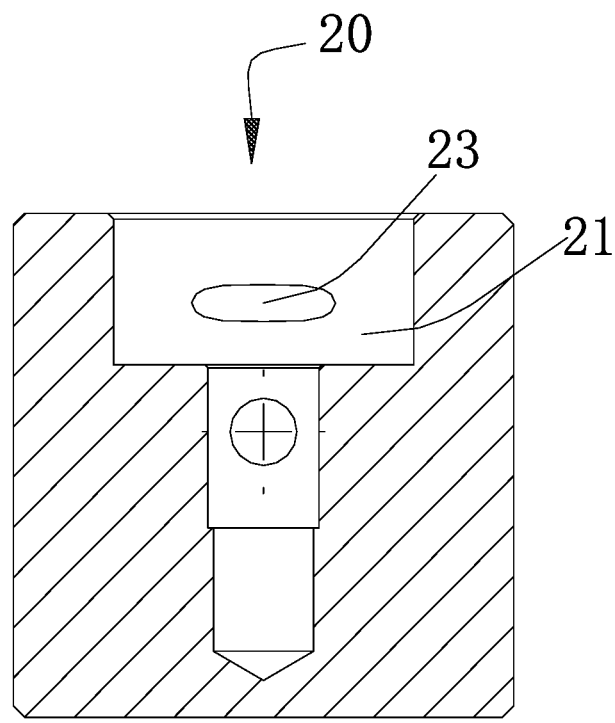
FIG. 10 is a schematic diagram of a cross section of a valve seat with another view in an embodiment of the present disclosure.
Figure 11:
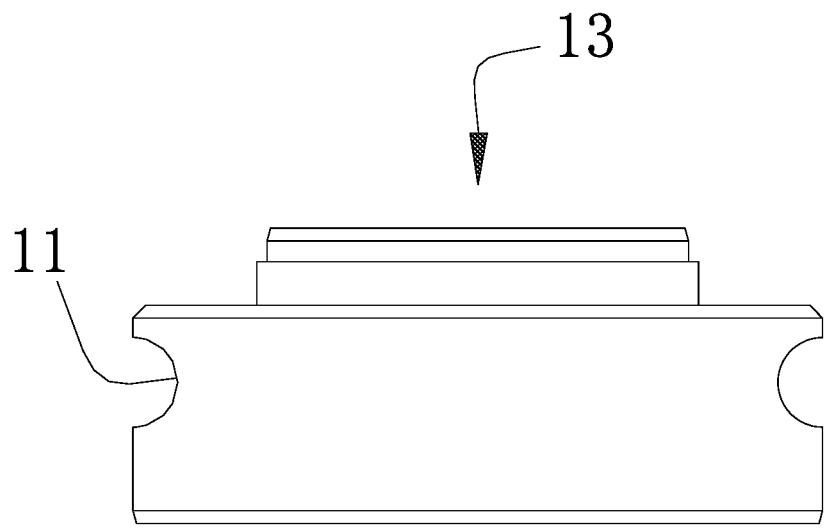
FIG. 11 is a schematic diagram of a mounting seat in an embodiment of the present disclosure.

Referring to FIG. 1 to FIG. 3, the valve body unit 10 may include a valve body 12 and a mounting seat 13, and the mounting seat 13 may be fixed to an end of the valve body 12. The end of the valve body 12 may be mounted in the mounting cavity 21, the mounting seat 13 may be accommodated in the mounting cavity 21 with the mounting of the valve body 12, and the limiting unit 30 may abut against the mounting seat 13.

Alternatively, in the present embodiment, the valve body 12 may be made of stainless steel. In other embodiment, the valve body 12 may be made of other materials, which is not elaborated herein.

Alternatively, in the present embodiment, the valve body 12 may be substantially cylindrical. In other embodiment, the valve body 12 may be in other shapes, which is not elaborated herein.

Furthermore, a part of the valve body unit 10 is inserted into the mounting cavity 21, the valve body unit 10 is provided with a limiting groove 11 corresponding to the mounting hole 22 along the radial direction of the cross section of the mounting cavity 21, and the limiting groove 11 is located at a circumferential wall of the mounting seat 13. When the valve body unit 10 extends into the mounting cavity 21 and the mounting seat 13 is accommodated in the mounting cavity 21, the limiting groove 11 of the mounting seat 13 is corresponding to the mounting groove 23 of the valve seat 20, the limiting unit 30 is located between the mounting groove 23 and the limiting groove 11, so as to achieve simultaneous fixation of the valve seat 20 and the valve body 12 along an axial direction and a circumferential direction. In other words, the valve body 12 cannot move up and down relative the valve seat 20, and the valve body cannot rotate relative to the valve seat 20.

Compared with the related art, in the valve device of the present disclosure, the mounting groove 23 is located at the valve seat 20, the end of the limiting unit 30 is inserted into the mounting groove 23, and the limiting unit 30 abuts against the part of the valve body unit 10 extending into the mounting cavity 21, thereby achieving a purpose of limiting circumferential rotation of the valve body unit 10 relative to the valve seat 20 and limiting axially detaching of the valve body unit 10 from the valve seat 20, which is not only reliable, but also easy and simple to assemble.

Specifically, the limiting unit 30 may include a limiting rod 31 and a locking member 32, an end of the limiting rod may extend into the mounting cavity 21 from the mounting hole 22, abut against the mounting seat 13 groove, and be inserted between the mounting groove 23 and the limiting groove 11, and the other end of the limiting rod 31 may be located in the mounting hole 22. The locking member 32 may be threadedly connected to the mounting hole 22, and an end of the locking member 32 may abut against the limiting rod 31. The locking member 32 is configured to fix the limiting rod 31 and prevent the valve body 12 from rotating and detaching from the valve seat 20.

Alternatively, in the present embodiment, an end of the limiting rod 31 away from the mounting cavity 21 may be connected to the locking member 32 by welding, an interference fit, or integral molding, which is not elaborated herein.

Alternatively, in the present embodiment, when the limiting rod 31 extends between the mounting groove 23 and the limiting groove 11, a threaded connecting or an interference fit may be applied, which is not elaborated herein. An interference fit of the limiting rod 31 between the mounting groove 23 and the limiting groove 11 may enable the limiting rod 31 not to shake in the mounting groove 23, thereby avoiding affecting a position relationship between the valve seat 20 and the valve body 12, and thus ensuring normal operation of the valve device 100.

It could be understood that an interference fit between the limiting unit 30 and the mounting groove 23 may enable the limiting unit 30 not to shake in the mounting groove 23, thereby avoiding affecting the position relationship between the valve seat 20 and the valve body 12, and thus improving stability of the valve device 100.

In the present embodiment, the end of the limiting rod 31 may extend through the mounting hole 22 and be inserted into the mounting groove 23 and the limiting groove 11. The locking member 32 may be screwed into the mounting hole 22 by a threaded connection and then connected to the other end of the limiting rod 31.

It could be understood that the mounting hole 22 may be located at the valve seat 20, and the locking member 32 may be threadedly connected to the mounting hole 22, thereby preventing the valve body 12 from rotating and detaching from the valve seat 20.

Alternatively, in the present embodiment, the locking member 32 may include a bolt, a screw, or a nut, which is not elaborated herein.

It should be noted that in the present embodiment, a cross section shape of the limiting rod 31 may include any one of a circle, a square, or an oval. A cross section shape of the locking member 32 should be any one of the circle, the square, or the oval corresponding to the limiting member 33.

Referring to FIG. 1 to FIG. 5, the limiting unit 30 may include a limiting member 33 arranged in an integrated way, and the limiting member 33 may include an insertion portion 331, an abutment portion 332, and a connecting portion 333 arranged in order; when the limiting member 33 is inserted into the mounting hole 22, the insertion portion 331 may be inserted into the mounting groove 23, the abutment portion 332 may abut against the limiting groove 11, and the connecting portion 333 may be located in the mounting hole 22 and connected to the valve seat 20. In this way, when the limiting member 33 is partially inserted into the mounting hole 22, the insertion portion 331 may first enter the mounting hole 22, which plays a guiding role and facilitates smooth entry of the limiting member 33.

Alternatively, in the present embodiment, the same side wall of the valve seat 20 may be provided with two mounting holes 22 at interval, which facilitates mounting of the locking member 32 in the mounting holes 22 and disposing of the mounting holes 22 of the valve seat 20. The number of limiting units 30 and the number of mounting grooves 23 may be the same as the number of the mounting holes 22, respectively. In other embodiments, the number of the mounting holes 22 may be one, three, four, five, or more, and the mounting holes 22 may be provided on different side walls of the valve seat 20, which is not elaborated herein.

Alternatively, in another embodiment, the same side wall of the valve seat 20 may be provided with two mounting holes 22 at interval; the number of limiting units 30 may be the same as the number of the mounting holes 22; and the mounting groove 23 may extend along a circumferential direction of the mounting cavity 21, and two limiting units 30 may be inserted into the mounting groove 23. In other words, the mounting groove 23 may extend circumferentially around the side wall of the mounting cavity 21, which is convenient for processing and can limit the limiting unit 30. In other embodiments, the number of the mounting holes 22 may be one, three, four, five, or more, and the mounting holes 22 may be provided on different side walls of the valve seat 20, which is not elaborated herein.

Alternatively, in the present embodiment, the limiting rod 31 may include a positioning pin. In other embodiments, the limiting rod 31 may also include other types of components, which is not limited herein.

Alternatively, in the present embodiment, an axis of the limiting unit 30 may be perpendicular to an axis of the valve body 12, so that the limiting unit 30 is capable of perform limiting along the axial direction and the circumferential direction between the valve body 12 and the valve seat 20. In other embodiments, an angle may be defined between the axis of the limiting unit 30 and the axis of the valve body 12, but the axis of the limiting unit 30 and the axis of the valve body 12 cannot be parallel to each other, if so, it is only achieved that limiting along a circumferential direction and not limiting along an axial direction.

In the limiting process of the limiting unit 30 of the present disclosure, the limiting rod 31 may first extend into the mounting cavity 21 from the mounting 22 of the valve seat 20, the insertion portion 331 of the limiting rod 31 may be inserted into the mounting groove 23, the abutment portion 332 may abut against the limiting groove 11, the connecting portion 333 may be located in the mounting hole 22 and connected to the valve seat 20, and then the locking member 32 may be screwed into the mounting hole 22 and connected to the connecting portion 333 of the limiting rod 31, thereby achieving fixation of the valve seat 20 and the valve body 12 along the axial direction and the circumferential direction, which has easier machining and more efficient assembly.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. A valve device, comprising a valve body unit and a valve seat, the valve seat being provided with a mounting cavity, and an end of the valve body unit being mounted in the mounting cavity;
    wherein the valve device further comprises a limiting unit, an outer side wall of the valve seat is provided with a mounting hole extending in a radial direction of a cross section of the mounting cavity along a radial direction of the valve body unit, the mounting hole is in communication with the mounting cavity, a side wall of the mounting cavity is recessed to form a mounting groove corresponding to the mounting hole, a part of the valve body unit is inserted into the mounting cavity, the valve body unit is provided with a limiting groove corresponding to the mounting groove along the radial direction of the cross section of the mounting cavity, an end of the limiting unit extends into the mounting cavity from the mounting hole and is inserted into the mounting groove, and a part of the limiting unit that extends into the mounting cavity abuts against the limiting groove to limit relative movement along an axial direction and a circumferential direction between the valve body unit and the valve seat;
    the limiting unit comprises a limiting rod, an end of the limiting rod extends into the mounting cavity from the mounting hole, abuts against the limiting groove, and is inserted into the mounting groove, and the other end of the limiting rod is located in the mounting hole;
    the limiting unit further comprises a locking member threadedly connected to the mounting hole, and an end of the locking member abuts against the limiting rod; and
    the locking member comprises a bolt or a screw.

2. The valve device of claim 1, wherein the limiting unit is connected to the mounting groove by an interference fit, and is connected to the mounting hole by an interference fit; or
    the limiting unit is threadedly connected to the mounting groove, and is connected to the mounting hole by an interference fit.

3. The valve device of claim 1, wherein the limiting unit is threadedly connected to either or both of the mounting groove and the mounting hole; or
    the limiting unit is connected to the mounting groove by an interference fit, and is threadedly connected to the mounting hole.

4. The valve device of claim 1, wherein a cross section shape of the limiting rod comprises any one of a circle, a square, or an oval.

5. The valve device of claim 1, wherein the valve body unit comprises a valve body and a mounting seat, and the mounting seat is fixed to an end of the valve body;
    the end of the valve body is mounted in the mounting cavity, the mounting seat is accommodated in the mounting cavity with the mounting of the valve body, the limiting groove is provided on the mounting seat, and the limiting unit abuts against the mounting seat and the limiting groove.

6. The valve device of claim 1, wherein the limiting unit comprises a limiting member, and the limiting member comprises an insertion portion, an abutment portion, and a connecting portion arranged in order and integrated formed;
    when the limiting member is inserted into the mounting hole, the insertion portion is inserted into the mounting groove, the abutment portion abuts against an outer wall of the valve body unit, and the connecting portion is located in the mounting hole and connected to the valve seat.

7. The valve device of claim 1, wherein a same side wall of the valve seat is provided with two mounting holes at interval, and a number of limiting units and a number of mounting grooves are the same as a number of the mounting holes, respectively.

8. The valve device of claim 1, wherein different side walls of the valve seat are provided with two mounting holes at interval, and a number of limiting units and a number of mounting grooves are the same as a number of the mounting holes, respectively.

9. The valve device of claim 1, wherein a same side wall of the valve seat is provided with two mounting holes at interval;
    a number of limiting units is the same as a number of the mounting holes; and
    the mounting groove extends along a circumferential direction of the mounting cavity, and two limiting units are inserted into a respective one of two mounting grooves.

10. The valve device of claim 1, wherein different side walls of the valve seat are provided with two mounting holes at interval;
    a number of limiting units is the same as a number of the mounting holes; and
    the mounting groove extends along a circumferential direction of the mounting cavity, and two limiting units are inserted into a respective one of two mounting grooves.

11. The valve device of claim 1, wherein an axis of the limiting unit is perpendicular to an axis of the valve body unit.

* * * * *